G. H. UNDERHILL.
SOUND REPRODUCING OR RECORDING MACHINE.
APPLICATION FILED JULY 28, 1904.

1,185,149.

Patented May 30, 1916.
5 SHEETS—SHEET 1.

Witnesses:
Horace A. Crossman
Everett S. Emery

Inventor:
George H. Underhill
by Emery, Booth & Powell
Attys.

G. H. UNDERHILL.
SOUND REPRODUCING OR RECORDING MACHINE.
APPLICATION FILED JULY 28, 1904.

1,185,149.

Patented May 30, 1916.
5 SHEETS—SHEET 4.

Witnesses:
Horace A. Crosman
Everett S. Emery

Inventor:
George H. Underhill
by Emery, Booth & Powell
Attys

UNITED STATES PATENT OFFICE.

GEORGE H. UNDERHILL, OF BOSTON, MASSACHUSETTS.

SOUND REPRODUCING OR RECORDING MACHINE.

1,185,149.  Specification of Letters Patent.  Patented May 30, 1916.

Application filed July 28, 1904. Serial No. 218,492.

*To all whom it may concern:*

Be it known that I, GEORGE H. UNDERHILL, a citizen of the United States, residing at Boston, in the county of Suffolk and State of Massachusetts, have invented an Improvement in Sound Reproducing or Recording Machines, of which the following description, in connection with the accompanying drawings, is a specification, like letters on the drawings representing like parts.

My invention consists in improvements in sound-reproducing or recording machines, being particularly, though not exclusively, concerned with machines employing a plurality of records which are brought successively into operative relation with the sound-recording or reproducing mechanism.

I have herein illustrated one specific embodiment of my invention as applied to a sound-reproducing or recording machine employing a feeding mechanism by means of which the records are singly and automatically transferred from a traveling magazine or holder into operative relation with the sound-reproducing mechanism of the machine. Subsequently, after reproduction of an individual record, the latter is then automatically withdrawn from its operative position upon the machine and replaced in the holder, which then advances to bring a fresh record adjacent the machine. The new record is then automatically transferred to the machine, the stylus mechanism restored to its initial position, and the operations of the machine, which, during the interval of feeding the records on and off the holder have been suspended, are repeated as described.

My invention will be best understood from the following description, when taken in connection with the accompanying illustration, of the one specific embodiment thereof by which I have herein illustrated the same, while its scope will be more particularly pointed out in the appended claims.

Figure 9:
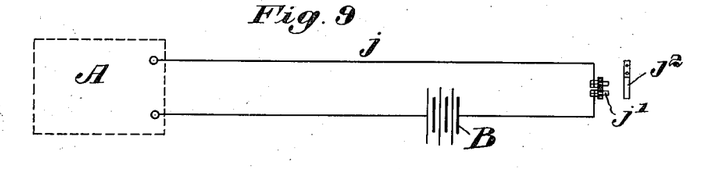

In the drawings I have illustrated one embodiment of my invention as applied to a common form of phonograph, employing (Fig. 1) the cylindrical record support $a$, having a slightly tapered exterior, over the smaller end of which may be slid an ordinary cylindrical record shell which is employed in this particular type of machine selected for illustration. The record support $a$ (Figs. 1 and 7) is rigidly connected to the threaded shaft $a'$, the latter being suitably journaled upon the frame $a^2$ of the machine and adapted to rotate the support with its record, as is usual, in operative relation to the sound-recording or reproducing mechanism. The cylinder overhangs the frame and the ball bearing $a^x$, the latter being provided, in the absence of the usual centering screw at the outer end of the cylinder, to center the same by movement of the screw $a^0$. The sound box, stylus and connected parts may be of any desired or ordinary construction, and are therefore not herein shown, but are carried by the arm $a^3$, secured to the sleeve $a^4$, slidable on the stationary guiding shaft $a^5$, the latter being parallel with the record support. Secured to one end of the sleeve $a^4$ (Fig. 7) is an arm $a^6$, carrying the nut $a^7$, which, during the operation of the machine, is adapted to engage with the comparatively fine threads upon the shaft $a'$ and cause the travel of the stylus in contact with the record from the initial end (left-hand in Fig. 1) of the cylinder to the opposite end thereof, the usual rotary motion being imparted to the shaft $a'$ and the record through the driving belt $a^8$ connected with any suitable phonograph motor, such for example, as the electric motor A indicated in Fig. 1 and diagrammatically in Figs. 6 and 9.

During the travel of the stylus, the threaded, adjustable, electrically connected points $b$ (Figs. 1, 6 and 7), carried by, but insulated from, the overhanging end of the arm $a^3$, are caused to contact with the tilting shelf $b'$, hinged to the frame $a^2$ of the phonograph and to bridge an electrical circuit between the two contacts $b^3$ (Fig. 6) upon the face of the shelf $b'$ when the desired limit of stylus travel has been reached.

Figures 1, 4:
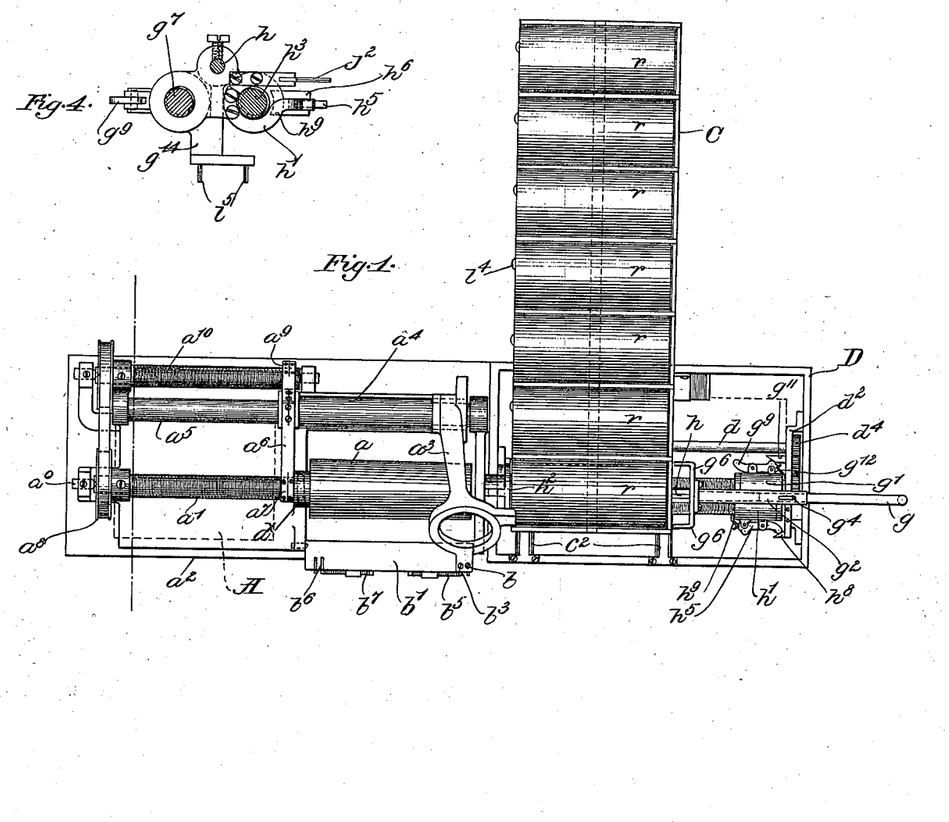
Figure 1 is a plan view of the machine by which I have herein illustrated my invention.
Fig. 4 is a section on the line 4—4 in Fig. 5 looking toward the right and showing the feeding carriages.
Figure 5:
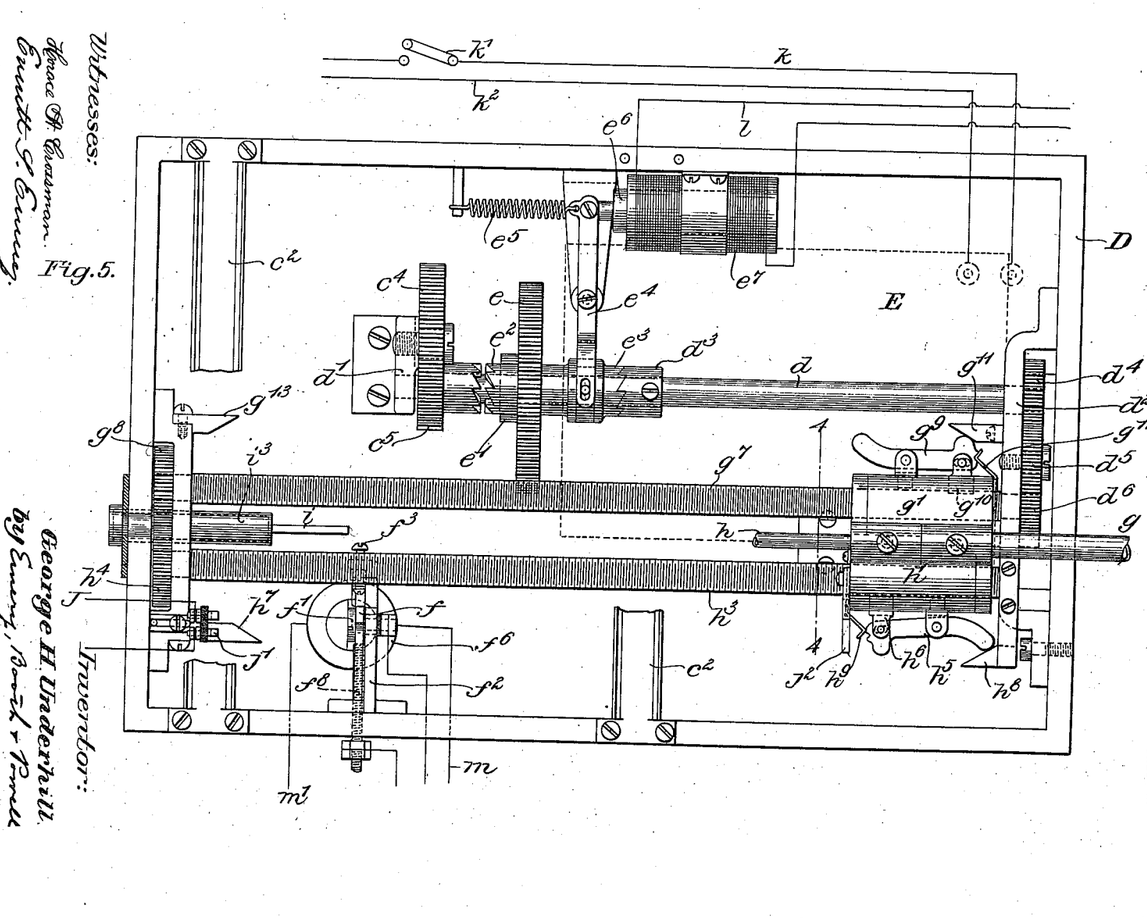
Fig. 5 is a plan view on an enlarged scale of the feeding mechanism with the traveling carrier removed.
Figure 6:
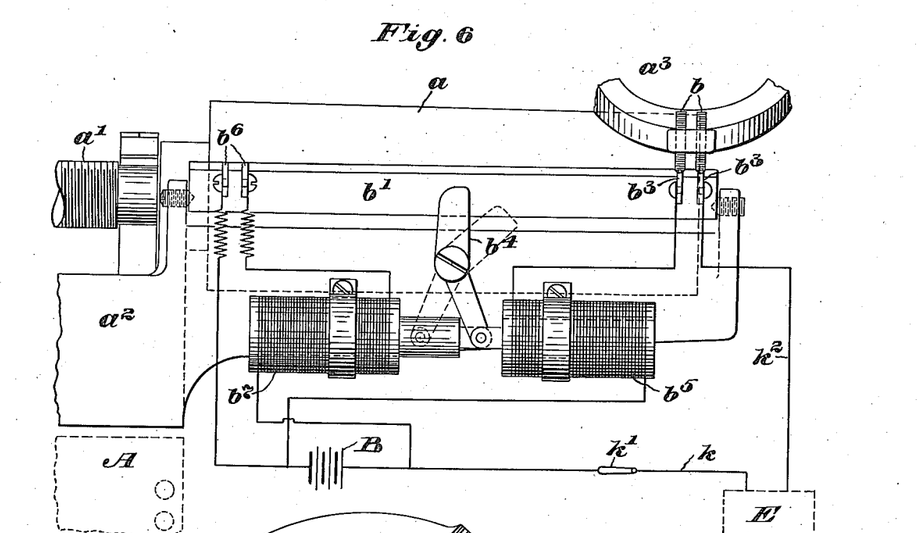
Fig. 6 is an elevation, partly diagrammatic, showing the tilting shelf and the control thereof.

The shelf $b'$ rests upon the cam lever $b^4$ and, during recording or reproduction, is in the dotted line position Figs. 5 and 6. The completion of the circuit referred to, however, causes, as will be more fully described, energization of the magnet $b^5$ and the movement of the cam lever $b^4$ to the full-line position shown, resulting in lifting the shelf $b'$ into the position also shown in full lines. This raises the arm $a^3$, withdraws the stylus from the record and the nut $a^7$ from the feeding screw $a'$ causing the simultaneous engagement of the nut $a^9$, also connected to the sleeve $a^4$, with the coarse threaded return feed screw $a^{10}$. After the lapse of an interval, during which the phonograph motor stops and the feeding mechanism acts to substitute a fresh record for the one already on the machine in a manner hereinafter to be described, the phonograph motor again starts and causes the return of the stylus to its initial position through rotation of the screw $a^{10}$, which is also connected to be driven by the belt $a^8$, as shown in Fig. 1. The shape of the cam lever $b^4$ is such that it naturally remains in the full-line position shown in Figs. 5 and 6, after the points $b$ have left the contacts $b^3$ and the magnet $b^4$ has become deenergized, until continued stylus travel causes the points to bridge the contacts $b^6$ at the opposite end of the shelf $b'$, acting thereby to energize the magnet $b^7$ and throw the lever $b^4$ into the dotted-line position shown, dropping the shelf and the sound-reproducing mechanism into its normal or operative position and bringing the stylus into contact with the new record.

Figure 2:
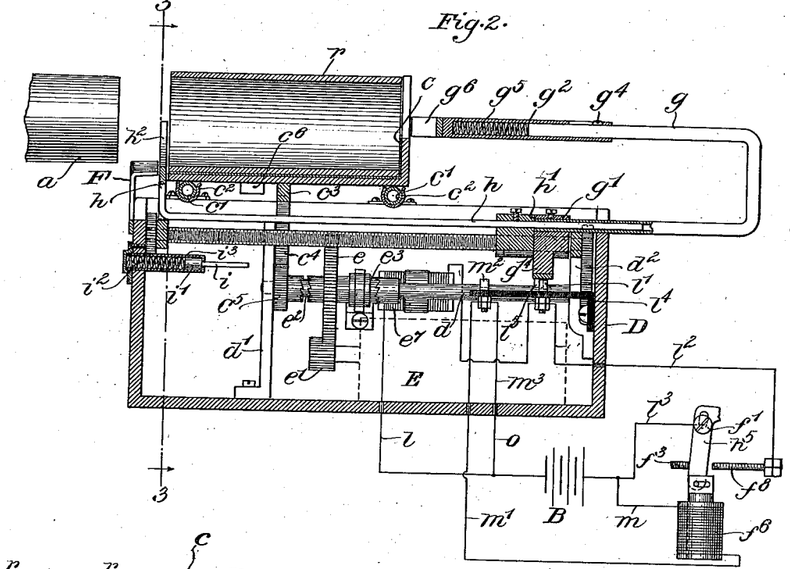
Fig. 2 is a sectional elevation of the record feeding mechanism taken on the line 2—2 in Fig. 3.
Figure 3:
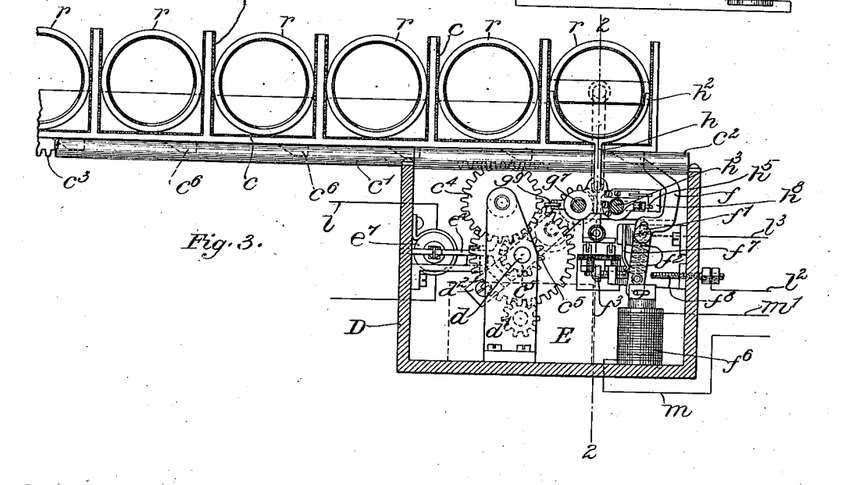
Fig. 3 is a sectional elevation looking toward the right, and on the line 3—3 in Fig. 2.

Referring more particularly to Figs. 1 and 3, I have herein provided a record magazine or holder C to hold one or any number of records $r$ and from which the said records may be withdrawn and placed upon the record support $a$. The form and construction of such holder may be widely varied and obviously will be modified to suit the shape, type and construction both of the machine and the records employed, and my invention in this respect is in no wise limited. I have, however, herein shown the holder C to consist of a rectangular tray divided by parallel walls into a number of compartments, herein seven, in which the separated records rest, suitable means being provided, such as the lining $c$, of felt or like material, for the separate compartments, to prevent injury to the surface of the records. Secured to the bottom of the holder are parallel tubular shoes $c'$ which are adapted to slide within suitable stationary, semi-tubular guides $c^2$ secured to the top of the frame D of the feeding mechanism, the latter being removably connected to the phonograph frame $a^2$ in such a position that movement of the record holder C upon the frame of the feeding mechanism permits any individual record to be brought into axial alinement with the supporting cylinder $a$, as is best shown in Figs. 1 and 2. The travel of the holder C is effected by means of a rack $c^3$, secured to the bottom thereof, and engaging with a holder driving gear $c^4$, the latter meshing with the holder driving pinion $c^5$. The pinion $c^5$ rotates upon the shaft $d$, the latter being journaled at one end in the stationary upright support $d'$ and at the opposite end in the bracket $d^2$. Loosely mounted on the shaft $d$, both to rotate and slide thereon, is the main driving gear $e$, driven by the broad faced intermeshing motor pinion $e'$, the latter being driven by the feeding motor E, which is indicated in dotted lines, and is preferably electric. The sliding driving gear $e$ is provided at one side with clutch teeth $e^2$, adapted to engage with corresponding teeth upon the holder driving pinion $c^5$, thereby to drive the latter, and also at the opposite side with clutch teeth $e^3$ to clutch and drive the clutch member $d^3$ secured to the shaft $d$, when the said gear is thrown to the position shown in Fig. 5. The position of the driving gear $e$ is controlled by the shifting lever $e^4$, which is held normally in the position shown in Fig. 5 by the tension spring $e^5$, but, being connected to the core $e^6$ of the solenoid $e^7$, is adapted, on energization of the latter, to be moved about its fulcrum to disengage the teeth $e^3$ from the clutch member $d^3$ and to engage the teeth $e^2$ with the holder driving pinion $c^5$. The feed motor, therefore, when in motion, will normally, during deënergization of the magnet $e^7$, cause rotation of the shaft $d$, through the clutch member $d^3$, but, upon energization of the said magnet and the subsequent clutching of the driving gear $e$ to the pinion $c^5$, movement will be transmitted directly to the latter to rotate the gear $c^4$ and, through the rack $c^3$, cause travel of the holder C.

Figure 10:
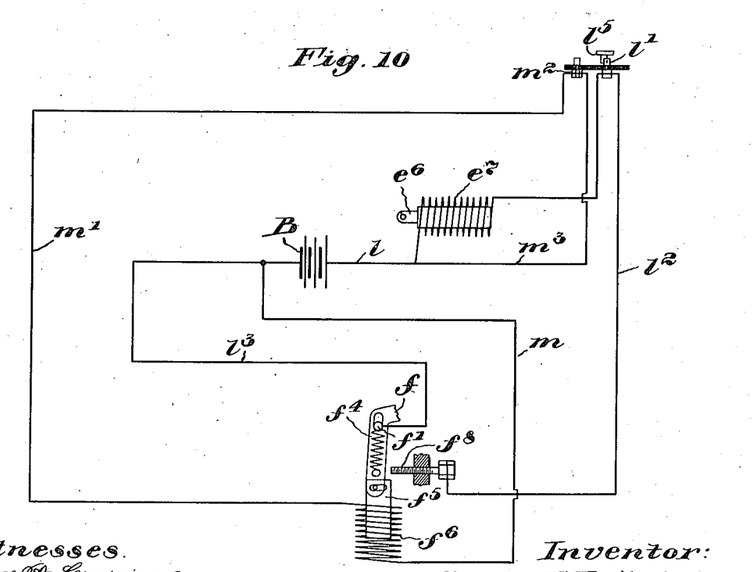

Depending from the bottom of the holder (Fig. 3) is a series of lugs $c^6$, there being provided one to correspond to each of the record compartments, each lug being so located relatively to its respective compartment as to bring the contained records in substantially accurate alinement with the supporting cylinder $a$, when the face of the lug is brought against the tip of the finger $f$ (Fig. 3), the latter being fulcrumed upon a pin $f'$ secured to the bracket $f^2$. When a lug $c^6$ comes in contact with the finger $f$, the latter is firmly seated against the adjustable stop screw $f^3$, also carried by the bracket $f^2$, thereby causing the holder to come to a fixed predetermined position. Where the fulcruming pin $f'$ passes through the finger $f$ the latter is slotted, as indicated in Fig. 3, the bottom of the slot however, being normally held against the pin, as shown in Figs. 3 and 10, by means of the tension spring, $f^4$, secured between the fulcruming pin and a pin upon the lever. The bottom of the finger $f$ is loosely connected to the plunger $f^5$ of the solenoid $f^6$, so that when the latter is energized, the plunger and the attached finger are drawn downward and against the tension of the spring $f^4$. The point of the finger then leaves the face of the lug $c^6$, and, the pressure by the lug $c^6$ against the finger being relieved, the latter is forced by a spring $f^7$ away from the stop screw $f^3$ and against the oppositely arranged contact screw $f^8$. When drawn downward by the solenoid, the finger $f$ remains in a substantially upright position and, on deënergization of the solenoid, rests with its tip against the bottom of the lug. The holder is now unlatched and may be advanced one step as soon as the driving gear $e$ is clutched to the holder driving pinion $c^5$. When the holder moves, the finger, which is pulled upward against the bottom of the lug $c^6$ by the spring $f^4$, is left in position to engage with the succeeding lug and properly position the succeeding record relatively to the phonograph cylinder.

Referring more particularly to Figs. 1, 2, 3 and 5, the mechanism which I have herein illustrated for transferring the records from the holder to the machine, and vice versa, comprises the pusher arm $g$, one end of which is secured to the traveling pusher carriage $g'$. The arm has a double bend to bring its other end opposite to and adjacent the outer edges of the records carried by the holder C, where it is provided with a telescopic sleeve, $g^2$, slidable upon the end of the arm $g$ with a movement limited by the pin $g^4$, acting within a slot upon the sleeve $g^2$, there being a spring $g^5$ located within the sleeve to provide a yielding connection between the said arm $g$ and the pusher foot $g^6$, which is secured to the end of the sleeve $g^2$. The tips of the pusher foot $g^6$ are in line with the edges of the record, as shown in Figs. 1 and 2, and are adapted to engage the same and push the record out of its tray and on to the supporting cylinder $a$, when the pusher carriage $g'$ is moved from right to left. To remove the record from the cylinder and replace it in its tray from the holder, there is provided the puller arm, $h$, secured to the puller carriage, $h'$, the said arm having its end projecting beyond the carriage $h'$, in axial alinement with, and entering, the tubular end of the puller arm $g$. The opposite end of the puller arm $h$ is bent upward and carries the semi-circular yoke $h^2$, which lies adjacent the inner edges of that record in alinement with the record cylinder. When the record is forced upon the cylinder under the impulse of the pusher arm, the puller carriage $h'$, as will be more fully described, is caused to advance with the pusher carriage $g'$, and the puller yoke passes beneath the cylinder $a$ before the advancing record. After the record has been used, it is returned to the holder by opposite movement of the feeding carriages $g'$ and $h'$, which cause the puller yoke $h^2$ to engage with the edge of the record and pull it off from the cylinder and into its tray on the holder into the position shown in Fig. 2. The slotted guiding bracket F (Fig. 2) assists in guiding the records in their passage from the cylinder to the holder.

Referring now to the construction of the feeding carriages and more particularly to Figs. 3, 4 and 5, said carriages are adapted to slide lengthwise the feeding screws $g^7$ and $h^3$. The pusher screw $g^7$ is rotated from the shaft $d$, the latter having (Fig. 5) the driving pinion $d^4$ intermeshing with the intermediate gear $d^5$, the latter engaging with the gear $d^6$ upon the pusher screw $g^7$. The puller screw $h^3$ is provided with the gear $h^4$ intermeshing with the gear $g^8$ upon the pusher screw $g^7$ and rotated thereby in a direction reverse to that of the pusher screw $g^7$. The carriages present to each other closely fitting surfaces (Fig. 5) so that they may travel as a unit, one carriage forcing the other ahead of it, or they may undergo slight separation as will hereafter appear. The carriage $g'$ (Fig. 5) is provided at its side with the fulcrumed arm $g^9$, carrying the nut $g^{10}$, which may be swung into and out of engagement with the pusher screw $g^7$ through an opening in the side of the carriage by movement of the lever $g^9$. The latter is thrown to its position of engagement by contact with the stationary cam $g^{11}$, which occurs in the outer position of the carriage and as shown in Fig. 5, the spring $g^{12}$ coöperating with a notch in the side of the lever to retain the lever and the nut in their engaging positions until the carriage has reached the limit of its travel in the opposite direction, when the disengaging cam $g^{13}$ contacts with the opposite end of the lever $g^9$ to cause the latter to withdraw the nut $g^{10}$ from engagement with the screw, in which position it is retained by the said spring $g^{12}$. Upon the puller carriage $h'$ I have also provided a lever $h^5$ carrying a nut $h^6$, which is thrown into and out of engagement with the screw $h^3$ by contact with the stationary cams $h^7$ and $h^8$, respectively; the spring $h^9$ being also provided, and the several parts acting with respect to the carriage $h'$ precisely, although in reverse order, as the parts described upon the pusher carriage $g'$. Thus, when the two carriages are in the position shown in Fig. 5, the nut $h^6$ is out of engagement and the nut $g^{10}$ in engagement with its feed screw, and subsequent rotation of the said screws will cause the travel of the two carriages in a left-handed direction (Fig. 5), the pusher carriage forcing the puller carriage ahead of it, until the opposite limit of travel has been reached, when engagement of the levers $g^9$ and $h^5$ with the cams $g^{13}$ and $h^7$, respectively, will disengage the nut $g^{10}$ from the pusher feed screw $g^7$ and engage the nut $h^6$ with the puller feed screw $h^3$, and subsequent rotation of the feed screws will obviously result in the return of the two carriages. In order to clear the pusher arm from the record after the latter has been seated upon its support and to permit the free rotation of the record thereafter without interference, at the inner or left-hand end (Figs. 2 and 5) of the pusher carriage travel, I have provided the plunger $i$ having a piston $i'$ seated against the compression spring $i^2$ in the cylinder $i^3$. The pusher carriage is provided with a depending arm $g^{14}$ which is adapted to engage with the end of the plunger $i$ before the record has been pushed to its seat and to compress the spring $i^2$ before completion of carriage movement. At the moment the nut $g^{10}$ is withdrawn from the pusher screw $g^7$, the carriage is forced back by the spring-pressed plunger $i$, clearing the pusher foot $g^6$ from the end of the record. The puller arm is cleared from the record at each advance of the holder by a series of small projections $i^4$ at the side of the holder which force the puller arm into the position shown in Fig. 2.

Figure 7:
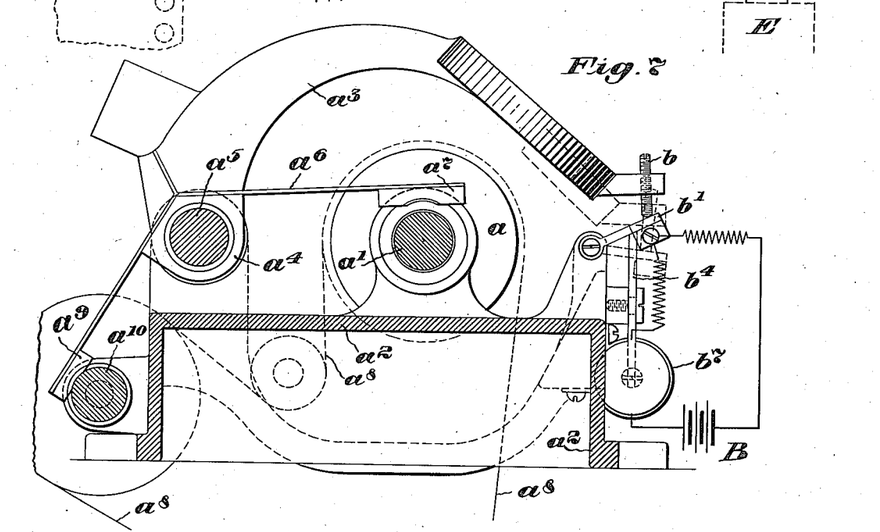
Fig. 7 is an enlarged cross sectional view of the phonograph showing the phonograph feed and the tilting shelf in end elevation.

The electrical controlling circuits, which, it will be understood, are shown in the several views, for the sake of clearness, largely diagrammatically, will be explained in connection with the description of the mode of operation of the machine which will now be given. Assuming that the traveling holder is in the position shown in Fig. 1 and that the first of the records is to be placed upon the machine, the feeding carriages $g'$ and $h'$ and the stylus carrying arm $a^3$ will also be in the position shown in Fig. 1, said stylus carrying arm having previously been raised into its inoperative position, ready for return, as shown in Fig. 7. The phonograph motor A is now at rest, for its circuit $j$ (Fig. 9) passes through two insulated contact fingers $j'$, which, (Fig. 5) are adjustably secured upon the frame D of the feeding mechanism, and at the left-hand end thereof as viewed in Fig. 5, within the path of the contact blade $j^2$, the latter being carried upon the puller carriage $h'$ and adapted to bridge the said contacts, and therefore energize and start the phonograph motor, only when the said carriage is at its extreme limit of travel opposite to that shown in Fig. 5.

Figure 8:
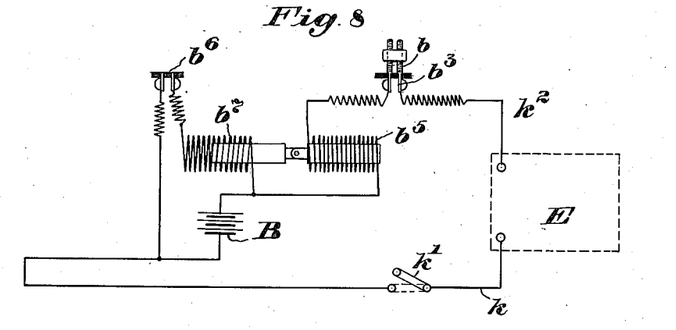
Figs. 8, 9 and 10 are diagrams of the circuit connections.

The feeding motor E has one of its poles connected (Figs. 5 and 8) by means of a conductor $k$ through a suitable circuit closing device $k'$, herein a hand-operated switch, with a source of electro-motive force B. The other pole of the motor is connected to the conductor $k^2$ in series with the contacts $b^3$ upon the tilting shelf $b'$ and the solenoid $b^5$, which operates to raise the said shelf. Thus, it will be seen that the feeding motor circuit may be broken either at the contacts $b^3$ or the switch $k'$, the former being now closed on account of the position of the arm $a^3$. As soon as the main controlling switch $k'$ is closed, the feeding motor immediately starts up and causes rotation of the feeding screws $g^7$ and $h^3$. The pusher carriage being in engagement with the pusher feeding screw $g^7$, the two carriages are caused to travel lengthwise the screw $g^7$; the pusher foot $g^6$ meets the ends of the record shell, forces it out of the holder and over the end of the adjacent cylinder; the yielding connection between the foot $g^6$ and the pusher arm $g$ permitting the latter to seat the record firmly upon the cylinder, without, however, the possibility of injury thereto, and permitting adaptation to variations in the exact size of the records. When the record is firmly seated upon the cylinder and the two carriages reach their limit of travel, as soon as disengagement of the nut $g^{10}$ occurs, the spring $i^2$, which has been previously compressed by the depending arm $g^{14}$ upon the pusher carriage, throws the latter backward far enough to clear the foot $g^6$ from the cylinder. Simultaneously, the cam $h^7$ moves the lever $h^5$ to engage the nut $h^6$ with the puller feeding screw $h^3$. In the meantime, however, and before reverse movement of the puller carriage $h'$ can take place, the switch blade $j^2$ mounted thereon has bridged the contacts $j'$ and caused the phonograph motor A to start, thus causing rotation of the reverse, phonograph feed screw $a^{10}$ and the backward travel of the stylus carrying arm $a^3$. The first movement of the latter causes the withdrawal of the contact points $b$ from the contacts $b^3$ and the interruption of the feed motor circuit, as will be evident from Fig. 8, the adjustment of the parts being such as to start the phonograph motor and stop the feed motor at substantially the same instant. The phonograph motor having started, the stylus carrying arm returns to its initial position, where bridging of the contacts $b^6$ energizes the solenoid $b^7$, drops the tilting shelf $b'$, causes engagement between the stylus and the record and starts the recording or reproduction, as the case may be. The record or reproduction will continue until the stylus arm has again reached the position where the contact points $b$ bridge the contacts $b^3$, whereupon the feed motor E and the feeding screws $g^7$ and $h^3$ again start, immediately stopping the phonograph motor through the withdrawal of the switch blade $j^2$ from the contacts $j'$, which takes place on the initial movement of the puller carriage $h'$, which is now in engagement with the puller screw $h^3$. Movement of the puller carriage $h'$ causes the pulling yoke $h^2$ forcibly to withdraw the record from the supporting cylinder $a$ into its compartment upon the holder C. On this return movement the carriage $h'$ overtakes the displaced pusher carriage $g'$ and forces the same with its connected pusher arm to its limit of travel, where, as has been described, the puller mechanism is disengaged and the pusher mechanism engaged with its corresponding screw.

Simultaneously, with the engagement of the pusher carriage with its feed screw, the rotation of the latter is interrupted for an interval by energization of the solenoid $e^7$, which clutches the driving gear $e$ to the holder driving pinion $c^5$, thereby to cause the holder to advance one step to bring a fresh record adjacent to and in alinement with the supporting cylinder $a$. The energization of the solenoid $e^7$ is effected in the following manner: Referring more particularly to Figs. 2 and 10, the solenoid $e^7$ is in series with the conductor $l$ leading from the battery B, through the normally separated contacts $l'$, thence through the conductor $l^2$ to the contact pin $f^8$ adapted to contact with the face of the finger $f$ when the latter is drawn downwardly by the solenoid $f^6$. The other pole of the battery B is connected, through the conductor $l^3$, with the pin $f'$ and therethrough with the finger $f$, so that the circuit is bridged at the contact pin $f^8$ when the finger $f$ contacts therewith. The contacts $l'$ are carried by the bracket $l^4$, secured to the frame D, and the circuit through the solenoid $e^7$ may be completed by bridging these contacts, which is accomplished by the traveling contact $l^5$ carried by the depending pusher carriage arm $g^{14}$, the bridging of the said contacts occurring when the carriage is at its outward limit of travel, as best shown in Fig. 2. To permit the full completion of the circuit and the energization of the solenoid $e^7$, when the carriage reaches that position, and before opportunity is given for backward travel, the other break in the said circuit at the contact pin $f^8$ has been previously closed by energization of the solenoid $f^6$. The latter (Figs. 2 and 10) is connected with one pole of the battery B through the conductor $m$, and with the other battery pole by a circuit which leads first through the conductor $m'$ to the contacts $m^2$ and thence to the battery through the conductor $m^3$. The two contacts $m^2$ are also secured to the bracket $l^4$ and within the path of the traveling contact $l^5$, but slightly displaced from the contacts $l'$.

At the early part of the travel of the pusher carriage, when it is engaged in pushing the record on to the cylinder, the contact $l^5$ bridges the contacts $m^2$, closing the circuit of the solenoid $f^6$ and thus permits the spring $f^7$ to force the lower part of the finger lever $f$ upon the contact pin $f^8$ and to close the break in the clutch solenoid circuit at that point. When, on subsequent carriage travel, the circuit of the solenoid $f^6$ is again broken, the released finger lever still remains in contact with the pin $f^8$, the point of the finger resting against the bottom of the lug $c^6$. After the feeding mechanism has carried the record on to the cylinder and then withdrawn the same and finally deposited it in the holder, it reaches the position shown in Fig. 2, where it then completes the clutch solenoid circuit by bridging the contacts $l'$, immediately throwing the clutch to advance the carriage, which now travels until the face of the next succeeding lug meets the finger point, which throws the finger away from the pin $f^8$ and seats it against the stop pin $f^3$, as shown in Fig. 3. This interrupts the clutch solenoid circuit and unclutches the gear $e$ from the holding driving pinion $c^5$, bringing the holder to rest in the position determined by the finger $f$. The gear $e$ is simultaneously clutched to the shaft $d$, through action of the spring $e^5$, immediately starting the previously engaged pusher carriage in motion, to carry the new record on to the cylinder. This alternating operation of the phonograph mechanism and the feeding mechanism may continue as long as desired or may be stopped at any time by opening the circuit at the switch $k'$.

I have herein shown the various electromotive devices connected to a battery or batteries designated as B, but obviously any source of electro-motive force may be employed for this purpose and such electromotive devices obviously may have a common or separate sources of electro-motive force, as desired.

It will be observed that the feeding mechanism which has been described is independent of and may be readily applied to or withdrawn from the phonograph shown, to permit the latter to be operated with or without the auxiliary feed. When it is desired to operate the phonograph without the feeding mechanism, the same may be set in motion by short-circuiting the contacts $j'$ through a controlling switch which may be provided for that purpose.

It is to be understood that my invention is not confined to any particular type of phonograph, or other sound-reproducing or recording machine, nor to the details or relative arrangement of parts composing the feeding mechanism, for these may undergo extensive modification without departing from the spirit of my invention, and many changes, both in construction and in mode of operation, which I do not deem it necessary to refer to, will be suggested to those skilled in the art. Furthermore, as will be readily understood by those skilled in the art, many obvious changes, unnecessary to refer to, may be made in the application of my invention to other types of machines or other purposes than the specific one herein disclosed. It is also to be understood that the particular form of record holder here employed may be varied widely from that shown, to suit conditions of use, the form, capacity, construction and mode of operation of the holder herein shown being submitted for illustrative purposes.

Claims:

1. In an apparatus of the class described, the combination with reproducing or recording mechanism of means for supporting a cylindrical record in operative relation to said mechanism, record holding means for holding a cylindrical record and means for automatically transferring a cylindrical record from said holding means to said supporting means.

2. In an apparatus of the class described, the combination with reproducing or recording mechanism, of means for supporting a cylindrical record in operative relation to said mechanism, record holding means for holding a cylindrical record and means for automatically transferring a cylindrical record from its operative position to said holding means.

3. In an apparatus of the class described, the combination with a sound-reproducing or recording machine having a record support, record holding means for holding a plurality of cylindrical records, means for moving said holding means relatively to said cylindrical record support to bring a record adjacent the same and automatic means for transferring a record from said holder to said support.

4. In an apparatus of the class described, the combination with a sound-reproducing or recording machine of a record support, a traveling record holder to hold a plurality of cylindrical records, automatic feeding means to feed a cylindrical record to and withdraw the same from said support, and means to advance said holder relatively to said support between operations of said feeding mechanism.

5. A sound-reproducing or recording machine, comprising in combination means for holding a plurality of cylindrical records and feeding means for automatically feeding said records from the holding means to an operative position on said machine.

6. In an apparatus of the class described, the combination with a cylindrical record support of means for automatically seating a record upon said support.

7. In a sound-reproducing or recording machine, the combination with a holder for cylindrical records of means automatically to remove the records from said holder.

8. In a sound-reproducing or recording machine, the combination with reproducing or recording mechanism, of means for holding one or more cylindrical records and means for automatically bringing a cylindrical record into and out of operative relation to said recording or reproducing mechanism, said means involving relative movement between said cylindrical record and said holder and freeing the former from the latter.

9. In a multiple record phonograph the combination with a plurality of cylindrical records, of a holder for said cylindrical records and means automatically to shift a record from said holder into playing position.

10. In a multiple record phonograph the combination with a plurality of cylindrical records, of a holder for said cylindrical records, means to shift a record from said holder into playing position and means automatically to present said records successively to said shifting means.

11. In a multiple record phonograph the combination with a plurality of cylindrical records, of a rotatable support, a holder and means automatically to shift a record from the holder to the support.

12. In a multiple record phonograph the combination with a rotatable support, of a holder to receive cylindrical records, means automatically to shift a cylindrical record from the holder to the support and back to the holder and means automatically to feed the holder.

13. In a multiple record phonograph the combination with a holder, of means for automatically moving the holder to bring each record as disposed thereon into axial alinement with its playing position and means to shift said record axially from said holder into playing position.

14. In a multiple record phonograph the combination with a record carrier for holding cylindrical records, of means for advancing said carrier as a whole to bring successive records into an approximate playing position and means for automatically shifting a record from said carrier and from said approximate playing position into an exact playing position.

15. In a multiple record phonograph the combination with a holder having compartments for holding a series of cylindrical records, of means for reciprocatively moving said holder to bring said records successively into an approximate playing position, and means for shifting a record to an exact playing position.

16. In a multiple record phonograph the combination with a holder for holding a series of cylindrical record shells, said shells being held loosely in said holder, of means for moving said holder to bring said shells into approximate playing position and means for automatically freeing a record shell from the holder and bringing it into exact playing position.

17. In a multiple record phonograph the combination with a record carrier for holding a series of cylindrical record shells, the latter adapted to rest upon their sides in said holder, of means automatically to engage a record shell and free it from the holder.

18. A phonograph having record holding means for loosely holding a cylindrical record and means for automatically engaging the record and placing it in playing position.

19. A phonograph having record holding means for holding a cylindrical record and means for automatically freeing a record from the holding means.

20. A multiple record phonograph having means for holding a plurality of cylindrical record shells, means for bringing the record shells into alinement with their final playing position, and means engaging with the walls of the record shells automatically to shift them to exact playing position.

21. The combination with a sound reproducing machine and its motor, of a record holder, a traveling member adapted to engage a record and shift it from said holder to said phonograph and a resilient buffer to move said member from braking contact with the record at the end of its travel.

22. A sound reproducing machine, comprising in combination, an electrically operated reproducing mechanism, a record holder, and a traveling member to shift a record from said holder to operative relation with said reproducing mechanism, the member acting to close the circuit of said mechanism at the close of its record transferring movement.

23. A sound reproducing machine, comprising in combination, an electrically operated reproducing mechanism, a record holder, and a traveling member having independent electrical operation to transfer a record between said holder and said reproducing mechanism, said mechanism and member acting in cycle, and mutually serving at the close of their respective periods of movement to complete the circuit one of another.

24. A sound reproducing machine, comprising in combination, a reproducing mechanism, a record holder, a traveling member adapted to shift a record to and from said record holder from and to said reproducing mechanism, feed screws for actuating said member and automatic means for bringing said member into driven relation to said feed screws.

25. A sound reproducing machine, comprising in combination, a reproducing mechanism, a record magazine, a traveling member adapted to feed a record from said magazine to said mechanism and to discharge the same from mechanism to magazine, and an electrically operated clutch to move said magazine in cycle with and between said discharging and charging movements, the member in its travel acting to energize the clutch operating mechanism at the close of the discharging movement.

26. A sound reproducing machine, comprising in combination, a reproducing mechanism, a record magazine, a traveling member adapted to feed a record from said magazine to said mechanism and to discharge the same from mechanism to magazine, and an electrically operating mechanism to move said magazine in cycle with and between said discharging and charging movements, the member in its travel acting to energize said mechanism at the close of the discharging movement.

In testimony whereof, I have signed my name to this specification, in the presence of two subscribing witnesses.

GEORGE H. UNDERHILL.

Witnesses:
 THOMAS B. BOOTH,
 EVERETT S. EMERY.